United States Patent
Zoller et al.

(10) Patent No.: US 11,241,761 B2
(45) Date of Patent: Feb. 8, 2022

(54) SHRINKING AND / OR SHRINKING CLAMPING STATION FOR TOOLS AND METHOD WITH A SHRINKING AND / OR SHRINKING CLAMPING STATION FOR TOOLS

(71) Applicant: E. Zoller GmbH & Co. KG Einstell-und Messgeraete, Pleidelsheim (DE)

(72) Inventors: Alexander Zoller, Pleidelsheim (DE); Christian Pfau, Ingersheim (DE)

(73) Assignee: E. ZOLLER GMBH & CO. KG EINSTELL-UND MESSGERÄTE, Pleidelsheim (DE)

( * ) Notice: Subject to any disclaimer, the term of this patent is extended or adjusted under 35 U.S.C. 154(b) by 51 days.

(21) Appl. No.: 16/835,419

(22) Filed: Mar. 31, 2020

(65) Prior Publication Data
US 2020/0316730 A1    Oct. 8, 2020

(30) Foreign Application Priority Data
Apr. 4, 2019 (DE) .................... 10 2019 108 904.2

(51) Int. Cl.
*B23P 11/02* (2006.01)
*B23B 31/117* (2006.01)

(52) U.S. Cl.
CPC ......... *B23P 11/027* (2013.01); *B23B 31/1179* (2013.01)

(58) Field of Classification Search
CPC ...... B23P 11/027; B23B 31/1179; H05B 6/14; H05B 6/02; H05B 3/06; Y10T 29/49863; Y10T 29/49865; Y10T 29/53417

USPC ....... 219/230, 659, 777; 269/8; 29/446, 447, 29/795
See application file for complete search history.

(56) References Cited

U.S. PATENT DOCUMENTS

| | | | |
|---|---|---|---|
| 6,861,625 B1* | 3/2005 | Haimer | H05B 6/365 219/607 |
| 2001/0054471 A1* | 12/2001 | Kelch | B23B 31/1179 156/85 |
| 2003/0088972 A1* | 5/2003 | Haimer | B23P 11/027 29/700 |

(Continued)

FOREIGN PATENT DOCUMENTS

| | | |
|---|---|---|
| DE | 202005012330 U1 | 10/2005 |
| DE | 102006029144 A1 | 12/2007 |

(Continued)

OTHER PUBLICATIONS

Extended EP Search Report dated Aug. 10, 2020 issued in corresponding EP patent application No. 20168038.6.

(Continued)

*Primary Examiner* — Saran G Afzali
*Assistant Examiner* — Darrell C Ford
(74) *Attorney, Agent, or Firm* — Posz Law Group, PLC (57) ABSTRACT

A shrink-clamping and/or unshrink-unclamping station for tools, for an at least largely automated shrink-clamping and/or unshrink-unclamping of tools into and/or from tool holders includes an induction heating unit and a cooling unit. The cooling unit can in an automated manner be brought into a heat-conductive contact with a tool holder previously heated by the induction heating unit.

15 Claims, 7 Drawing Sheets

(56) References Cited

U.S. PATENT DOCUMENTS

| | | | | |
|---|---|---|---|---|
| 2004/0111855 A1* | 6/2004 | Pfau | ....................... | B23P 11/027 29/407.04 |
| 2006/0078396 A1* | 4/2006 | Buttau | ................... | B23B 31/028 409/234 |
| 2006/0163245 A1* | 7/2006 | Pfau | ....................... | B23P 11/027 219/635 |
| 2008/0277093 A1* | 11/2008 | Haimer | ................. | B23P 11/027 165/80.1 |
| 2010/0051610 A1* | 3/2010 | Wittels | ................... | B23P 11/027 219/635 |
| 2010/0133262 A1* | 6/2010 | Haimer | .................... | H05B 6/14 219/635 |
| 2012/0186286 A1* | 7/2012 | Haimer | ................. | B23P 11/027 62/121 |
| 2015/0041456 A1* | 2/2015 | Haimer | ................... | H05B 6/365 219/643 |
| 2015/0367423 A1* | 12/2015 | Voss | .................... | B23B 31/1179 279/20 |
| 2016/0193666 A1* | 7/2016 | Haimer | ..................... | B22F 5/10 279/4.03 |
| 2019/0054546 A1* | 2/2019 | Haimer | ................... | B23P 11/027 |
| 2019/0070698 A1* | 3/2019 | Haimer | ..................... | H05B 6/14 |
| 2020/0061760 A1* | 2/2020 | Haimer | ..................... | H05B 6/38 |

FOREIGN PATENT DOCUMENTS

| | | |
|---|---|---|
| DE | 202013007878 U1 | 9/2013 |
| DE | 10 2013 114 644 B3 | 5/2015 |
| DE | 202015006540 U1 | 12/2015 |
| DE | 202017107214 U1 | 1/2018 |
| EP | 1310323 A2 | 5/2003 |
| EP | 1510287 A1 | 3/2005 |
| WO | 2015099259 A1 | 7/2015 |

OTHER PUBLICATIONS

Search Report dated Dec. 9, 2019 issued in corresponding DE patent application No. 10 2019 108 904.2 (English translation only).

* cited by examiner

SHRINKING AND / OR SHRINKING CLAMPING STATION FOR TOOLS AND METHOD WITH A SHRINKING AND / OR SHRINKING CLAMPING STATION FOR TOOLS

CROSS REFERENCE TO RELATED APPLICATION

This application is based on and incorporates herein by reference German Patent Application No. 10 2019 108 904.2 filed on Apr. 4, 2019.

STATE OF THE ART

The invention concerns a shrink-clamping and/or unshrink-unclamping station.

A shrink-clamping and/or unshrink-unclamping station for tools for an at least largely shrink-clamping and/or unshrink-unclamping of tools into and/or from tool holders, with an induction heating unit and with a cooling unit, has already been proposed.

The objective of the invention is in particular to provide a generic device having advantageous characteristics regarding a cooling of tool holders in a shrink-clamping process or in an unshrink-unclamping process of tools in tool holders. The objective is achieved according to the invention by the features of patent claims 1 and 20 while advantageous implementations and further developments of the invention may be gathered from the dependent claims.

Advantages of the Invention

The invention is based on a shrink-clamping and/or unshrink-unclamping station for tools for an at least largely automated shrink-clamping and/or unshrink-unclamping of tools into and/or from tool holders, with an induction heating unit and with a cooling unit.

It is proposed that the cooling unit can in an automated manner be brought into a heat-conductive contact with a tool holder previously heated by the induction heating unit. This allows achieving advantageous cooling characteristics. It is in particular advantageously possible to optimize a cooling process of the shrink-clamping process and/or of the unshrink-unclamping process of tools that takes places directly after a heating of the tool holder. In particular, it is possible to accelerate the shrink-clamping process or the unshrink-unclamping process, in particular by keeping a time period between heating and cooling particularly short. Moreover a high degree of automatization is advantageously achievable. Advantageously a high level of work safety is achievable, in particular by an automated handling of hot tool holders.

By a "shrink-clamping and/or unshrink-unclamping station for tools" is in particular a device to be understood which is configured for an implementation of a shrink-clamping process and/or an unshrink-unclamping process of tools in tool holders, in a manner that is preferably at least largely automated, preferentially completely automated. "Largely automated" is in particular to mean that that, except for an insertion of the tool and/or the tool holder in the shrink-clamping and/or unshrink-unclamping station and/or except for the removal of the tool and/or the tool holder from the shrink-clamping and/or unshrink-unclamping station, all work steps of the shrink-clamping and/or unshrink-unclamping station run independently from an operator. It is also conceivable that the insertion and/or the removal of the tool and/or the tool holder are/is also automated, for example by way of an industrial robot. In particular, the cooling process of the shrink-clamping process and/or of the unshrink-unclamping process is also implementable independently from an operator activity. By a "tool holder" is in particular a structural component to be understood which is configured to receive a tool and to connect the tool to a machine. The tool holder is in particular configured as a tool-machine interface. Preferentially the tool holder is embodied as a tool chuck, in particular a shrink-clamp chuck. The tool is in particular configured as a shaft tool, preferably a rotational shaft tool, e.g. a drill, a milling device, a profiling tool and/or a reamer.

By a "shrink-clamping of tools into and/or from tool holders" is in particular a clamping-in of tools in tool holders to be understood, in which a tool receiving opening of the tool holder is firstly expanded thermally, then a tool is inserted in the tool receiving opening and wherein eventually, following a cooling down of the tool holder, the tool is fixated in the tool holder by way of a force fit, in particular friction-fit. By an "unshrink-unclamping of tools in and/or from tool holders" is in particular a releasing of tools to be understood which are fixated in tool holders by means of a force fit, in particular a friction-fit, in which the tool receiving opening of the tool holder is expanded thermally, in particular while avoiding a simultaneous heating of the tool by means of a screening unit, until the tool fixated in the tool holder is removable from the tool holder.

In a shrink-clamping and/or unshrink-unclamping process the induction heating unit is configured to expand at least a portion of the tool holder by heating. The induction heating unit comprises at least one induction coil, which is at least configured to generate an induction-magnetic field. The induction-magnetic field is configured to interact with the material of the tool holder, thus heating said material. The cooling unit is configured for cooling a tool holder, which has in particular been heated previously by the induction heating unit. The cooling unit is configured to convey heat away from a tool holder, which has in particular been heated previously by the induction heating unit. The cooling unit in particular comprises at least one cooling body, which is configured to receive the heat from the tool holder. The cooling unit in particular comprises at least one cooling-agent cycle, which is configured to transport the heat received by the cooling body of the cooling unit away from the cooling body. The cooling unit moreover in particular comprises a nozzle, in particular a cooling nozzle, which is configured for blowing a cooling gas, in particular cooling air, onto a tool holder. "Configured" is in particular to mean specifically programmed, designed and/or equipped. By an object being configured for a certain function is in particular to be understood that the object fulfills and/or carries out said certain function in at least one application state and/or operation state. A "heat-conductive contact" is in particular to mean a touch contact of the cooling unit, in particular the cooling body, with the tool holder, the contact being configured to permit a heat flow from the tool holder to the cooling body. In particular, in the heat-conductive contact a region of the cooling unit with a heat conductivity that is greater than 10 W/(m*K), preferably greater than 40 W/(m*K) and preferentially greater than 100 W/(m*K) and a region of the tool holder with a heat conductivity that is greater than 10 W/(m*K), preferably greater than 20 W/(m*K) and preferentially greater than 40 W/(m*K) touch each other. In particular, in the heat-conductive contact the cooling unit contacts the tool holder in a circumferential direction of the tool holder. In particular, the cooling unit, preferably the cooling body, is brought into a heat-conductive contact with the tool holder at least by means of a put-on mechanism that is guided and driven in an automated manner.

It is further proposed that the shrink-clamping and/or unshrink-unclamping station comprises an, in particular single, linear guidance, along which at least the cooling unit and the induction heating unit are automatedly traversable, in particular in their axial directions. This allows achieving advantageous cooling characteristics. In particular, it is advantageously possible to optimize, in particular automatize, shorten, and/or make secure, a cooling process of the shrink-clamping process and/or the unshrink-unclamping process of tools taking place directly after a heating of the tool holder. The linear guidance is in particular embodied as a vertical guidance. In particular, the linear guidance is configured for an implementation of an automatedly guided movement of the cooling unit along a vertical axis of the shrink-clamping and/or unshrink-unclamping station. In particular, in the set-up position of the shrink-clamping and/or unshrink-unclamping station the vertical axis runs perpendicularly to a set-up area which the shrink-clamping and/or unshrink-unclamping station is installed. In particular, the axial direction of the cooling unit runs parallel to the vertical axis. In particular, the axial direction of the induction heating unit runs parallel to the vertical axis. In particular, the axial directions of the cooling unit and of the induction heating unit coincide with one another. In particular the axial directions of the cooling unit and of the vertical axis of the shrink-clamping and/or unshrink-unclamping station coincide with one another. In particular, the axial directions of the induction heating unit and of the vertical axis of the shrink-clamping and/or unshrink-unclamping station coincide with one another. In particular, the cooling unit and the induction heating unit are guided by one identical guiding unit, and the movement of the cooling unit and the induction heating unit is preferably driven by one identical drive shaft.

Furthermore it is proposed that in a mounted state, in particular a mounted state of the shrink-clamping and/or unshrink-unclamping station, the cooling unit and the induction heating unit are fixedly coupled with each other. This allows achieving advantageous cooling characteristics. In particular, it is advantageously possible to optimize, in particular to automatize and/or shorten, a cooling process of the shrink-clamping process or of the unshrink-unclamping process of tools taking place directly after a heating of the tool holder. Furthermore it is advantageously possible to do without a separate guiding of the induction heating unit and the cooling unit, which advantageously results in a cost reduction. In particular, the cooling unit and the induction heating unit are fixedly coupled with one another in an operational state of the shrink-clamping and/or unshrink-unclamping station. By a "fixed coupling" of the cooling unit and the induction heating unit with one another is in particular to be understood that the cooling unit and the induction heating unit are connected to one another in such a way that at least one structural component of one of the units is fixedly connected with a structural component of the other unit, and/or that respectively one structural component of the cooling unit and of the induction heating unit is fixedly connected with a further, shared structural component, which is in particular movable along the linear axis. In particular, in the mounted state and/or in the operational state, units which are fixedly coupled with one another, in particular the cooling unit and the induction heating unit, are movable only together along a shared movement axis.

It is also proposed that the cooling unit is arranged, in an axial direction of the induction heating unit, in particular in the vertical direction, directly beneath or directly above the induction heating unit. This allows achieving advantageous cooling characteristics. In particular, it is advantageously possible to optimize a cooling process of the shrink-clamping process or of the unshrink-unclamping process of tools taking place directly after a heating of the tool holder. In particular, this advantageously allows facilitating a putting-on of the cooling unit onto the tool holder by a simple traversing of the induction heating unit in the axial direction. The induction heating unit is in particular free of an internal cooling device and/or of internal cooling ducts. In particular, the induction heating unit and the cooling unit are implemented such that they can be put onto the tool holder separately.

If the cooling unit comprises at least an air cooler, advantageous cooling characteristics are achievable. It is in particular possible to facilitate a simple conveying in and/or away of the cooling agent, in particular the cooling air. The air cooler in particular comprises at least one nozzle, which is configured to blow cooling air towards a tool holder that is clamped in the shrink-clamping and/or unshrink-unclamping station. In particular, during a discharge of the cooling air the nozzle, preferably the cooling unit, is moved oscillatingly along the axial direction of the cooling unit, wherein preferentially a vertical extension of the movement range of the oscillating movement corresponds to a vertical extension of a previously heated region of the tool holder, in particular a clamping region of the tool holder. In this way especially effective cooling is advantageously achievable, in particular with the cooling air flowing evenly to the entire region that has been heated previously. In particular, during a discharge of the cooling air the nozzle, preferably the cooling unit, and/or the tool holder are/is rotated around the axial direction of the cooling unit and/or of the tool holder. This advantageously allows achieving particularly effective cooling, in particular with the cooling air flowing evenly to the entire region that has been heated previously. The cooling unit in particular comprises a plurality of nozzles, which are arranged in a distributed fashion. In particular, the nozzles are arranged in a ring shape around a shared center of the cooling unit and of the induction coil.

In addition it is proposed that the air cooler comprises a cool ring, which is in particular arrangeable around the tool holder. This allows achieving advantageous cooling characteristics. In particular, an especially favorable distribution of the cooling agent over a region of the tool holder that is to be cooled is advantageously achievable. The cool ring in particular comprises the plurality of nozzles. In particular, the nozzles are arranged towards a center of the cool ring. In particular the cool ring can be automatedly put over a tool holder that is fixated in a holding device of the shrink-clamping and/or unshrink-unclamping station. The cool ring in particular has a diameter that corresponds at least to an inner diameter of coil windings of the induction coil of the induction heating unit and/or that corresponds at least to an inner diameter of a central opening of the induction heating unit. In particular, the induction heating unit and the cool ring are centered around a shared axis, which extends along a center of the opening of the induction heating unit.

It is moreover proposed that the cooling unit comprises at least one cooling element that is capable of being flowed through by a cooling liquid. In this way advantageous cooling characteristics are achievable. In particular, this allows facilitating an especially advantageous and/or particularly effective heat carry-off. Preferably the cooling unit comprises at least the cooling element that is capable of being flowed through by the cooling liquid and the air cooler, in particular the cool ring. In particular, the cooling liquid is realized as water. Alternatively the cooling liquid may however as well be implemented different from water, e.g. as an oil or as an alcohol, and/or may comprise additives like an antifreeze agent and/or corrosion protection means.

Beyond this it is proposed that the cooling unit comprises at least one further cooling element that is capable of being flowed through by a cooling liquid and is embodied separately from the cooling element. A particularly high degree of flexibility of the cooling unit is advantageously achievable in this way. In particular, this advantageously allows achieving an especially effective cooling. In particular, the further cooling element is embodied as a mirroring of the cooling element. It is further conceivable that the cooling unit comprises more than two separate cooling elements. In particular, cooling-agent ducts of the cooling elements capable of being flowed through by the cooling liquid are connected in series. This advantageously allows obtaining a particularly simple shared cooling-agent cycle. Preferably the cooling-agent ducts of the cooling elements capable of being flowed through by the cooling liquid are connected in parallel. In this way an especially even cooling performance of the cooling elements is advantageously achievable.

It is also proposed that the shrink-clamping and/or unshrink-unclamping station comprises a support unit, which is configured for supporting the cooling element and the further cooling element such that they are movable relative to one another. It is in this way advantageously possible to achieve a high degree of flexibility of the cooling unit. In particular, an adaption to differently shaped tool holders is advantageously achievable, thus obtaining a particularly efficient and/or effective cooling of the tool holder. Moreover, by moving the cooling elements apart from each other a space may advantageously be created enabling an induction heating unit, which is arranged above the cooling unit and is fixedly coupled with the cooling unit, to be put upon a tool holder. In particular, the support unit is at least configured to permit the cooling elements to be linearly moved apart of and/or to be linearly moved towards one another. Alternatively or additionally it is possible for the support unit to be configured for a pivoting or a rotating of the cooling elements. The shrink-clamping and/or unshrink-unclamping station comprises a control and/or regulation unit. A movement of the cooling elements by means of the support unit is controllable and/or regulatable in an automated manner, in particular by means of the control and/or regulation unit. By a "control and/or regulation unit" is in particular a unit with at least one control electronics component to be understood. A "control electronics component" is meant to describe a unit with a processor unit and with a memory unit as well as with an operation program that is stored in the memory unit.

If the cooling element and the further cooling element are movable by means of the support unit at least in a plane that is perpendicular to a designated axial direction of a tool holder positioned in the shrink-clamping and/or unshrink-unclamping station, advantageous cooling characteristics are achievable. In particular, an especially easy connecting and/or disconnecting of the cooling unit may be facilitated. This in particular allows facilitating a particularly quick connecting of the cooling unit following a heating-up of a tool holder. It is in this way in particular possible to increase a work frequency and/or a throughput of the shrink-clamping and/or unshrink-unclamping station. The designated axial direction of the shrink-clamping and/or unshrink-unclamping station in particular coincides with the vertical axis of the shrink-clamping and/or unshrink-unclamping station. In particular, the tool holder positioned in the shrink-clamping and/or unshrink-unclamping station is positioned in the holding device of the shrink-clamping and/or unshrink-unclamping station, in particular in an attachment holder of the holding device.

Furthermore it is proposed that in a cooling operation state in which the cooling elements are in a heat-conductive contact with a tool holder, the cooling elements are configured to engage around the tool holder, at least to a large extent. This allows achieving advantageous cooling characteristics. In particular, especially effective and/or particularly even cooling of the previously heated region of the tool holder, in particular of the clamping region of the tool holder, are/is achievable. By a "clamping region of the tool holder" is in particular at least a region of the tool holder to be understood that surrounds, in particular in a radial direction, a tool receiving opening of the tool holder that is configured for receiving a tool. In the cooling operation state in particular the cooling elements are actively flowed through by the cooling agent. By the cooling elements "engaging around" the tool holder "to a large extent" is in particular to be understood that in the cooling operation state the cooling elements, viewed together, cover at least 60%, preferentially at least 80%, preferably at least 90% and particularly preferably at least 95% of a circumference of the tool holder, in particular of the clamping region. Especially advantageously, in the cooling operation state the cooling elements cover the entire circumference of the tool holder, in particular of the clamping region.

If in the cooling operation state, in which the cooling elements are in a heat-conductive contact with a tool holder, the cooling elements touch one another, advantageous cooling characteristics are achievable. In particular, an especially effective and/or efficient cooling of the tool holder is achievable. In particular, heat-conductive structural components of the cooling elements respectively touch each other in the cooling operation state. This advantageously allows achieving a favorable distribution of the heat carried away from the tool holder, as a result of which in particular an effectivity of the heat carry-off can be improved. in particular, the cooling elements encompass the tool holder completely in the circumferential direction of the tool holder. In particular, in an induction heating operation state, in which the tool holder, preferably the clamping region of the tool holder, is heated by the induction heating unit, the cooling elements are free of mutual contact.

It is also proposed that the support unit is configured, outside a cooling operation state, to bring the cooling elements in positions allowing an obstruction-free putting-on of the induction heating unit onto the tool holder. This advantageously allows a particularly efficient shrink-clamping process or unshrink-unclamping process. Moreover a high degree of automatization is advantageously achievable. In particular, outside the cooling operation state, in particular prior to the induction heating state, the support unit moves the cooling elements apart from one another. In particular, outside of the cooling operation state, in particular prior to the induction heating state, the cooling elements have a maximally possible distance from one another. In particular, in a plane that is perpendicular to the axial direction, in particular perpendicular to the vertical axis of the shrink-clamping and/or unshrink-unclamping station, a distance between the cooling elements is greater than a maximal extension of the holding device, in particular of the attachment holder of the holding device, and/or of the tool holder in the plane that is perpendicular to the axial direction, in particular perpendicular to the vertical axis of the shrink-clamping and/or unshrink-unclamping station.

Beyond this it is proposed that the cooling element, in particular both cooling elements, has/have an opening, in particular a half-shell opening, preferably a semispherical opening, which is configured to engage around approximately half a circumference of a tool holder. This allows achieving advantageous cooling characteristics. In particular, especially effective and/or particularly even cooling of the previously heated region of the tool holder, in particular the clamping region of the tool holder, is achievable. The opening is realized as a recess that is arranged sidewise on the cooling element. In at least three spatial directions the opening is not delimited by the cooling element. The opening is in particular realized as a semispherical opening. Alternatively the half-shell opening may also form a polygonal, an oval or a differently shaped opening. Preferentially a shape of the half-shell opening is adapted to potential outer shapes of the tool holders which are to be cooled by the cooling elements.

It is further proposed that at least a portion of the surface of the opening, in particular a region of the opening that is configured to establish the heat-conductive contact, is implemented by a flexible tissue, in particular a metal tissue, e.g. a copper tissue, a steel tissue or an aluminum tissue. This allows achieving advantageous cooling characteristics. It is in this way in particular possible to realize an especially effective heat-conductive contact between the cooling unit and the tool holder. Advantageously an adaption of a surface shape of the region of the opening configured to establish the heat-conductive contact to outer shapes of different tool holders may be facilitated. As a result, a high heat transfer, i.e. a quick heat carry-off, is advantageously achievable with different tool holders inserted in the shrink-clamping and/or unshrink-unclamping station. The flexible tissue is in particular made of a material having a high heat conductivity, in particular a heat conductivity that is greater than 10 W/(m*K), preferentially greater than 40 W/(m*K) and preferably greater than 100 W/(m*K). In particular, the flexible tissue is in the cooling operation state directly or indirectly washed around by the cooling agent on a side that faces away from the tool holder that is to be cooled.

In another aspect of the invention it is proposed that the cooling element, in particular both cooling elements, comprises at least one further opening, in particular half-shell opening, preferably semispherical opening, which is likewise configured to engage around approximately half a circumference of a tool holder, a diameter of the, in particular half-shell, preferably semispherical further opening differing from a diameter of the in particular half-shell, preferably semispherical opening. This allows achieving advantageous cooling characteristics. It is in particular in this way possible to establish an especially efficient heat-conductive contact between the cooling unit and the tool holder. Advantageously a particularly high compatibility of the cooling elements with different shapes and/or diameters of tool holders that are to be cooled is achievable. The cooling element and/or the further cooling element in particular comprise/comprises a plurality of further openings, in particular half-shell openings, in particular two, preferentially three, advantageously four, especially advantageously five, preferably six and particularly preferably more than six, in particular half-shell, openings having respectively different diameters. In particular, the number of the, in particular half-shell, openings of the cooling element corresponds to the number of the, in particular half-shell, openings of the further cooling element. In particular, the diameters of the, in particular half-shell, openings of the cooling element correspond to the diameters of the, in particular half-shell, openings of the further cooling element. In particular, a diameter of an in particular half-shell, preferably semispherical, opening is implemented as a linear distance of two opposite-situated side walls of the in particular half-shell, preferably semispherical, opening, which in a mounted state of the shrink-clamping and/or unshrink-unclamping station extends perpendicularly to the vertical axis of the shrink-clamping and/or unshrink-unclamping station, and/or as a linear distance between a side wall of the in particular half-shell, preferably semispherical, opening, which in the mounted state of the shrink-clamping and/or unshrink-unclamping station extends perpendicularly to the vertical axis of the shrink-clamping and/or unshrink-unclamping station, and a, preferably circular, imaginary prolongation of the shape of the in particular half-shell, preferably semispherical, opening.

If the cooling element and/or the further cooling element are/is rotatable, in particular around a rotational axis extending through the cooling element, it is advantageously possible to enable an automated adaption of a contact surface of the cooling element, which is configured to contact the tool holder for a heat carry-off. In particular, it is advantageously possible to select an, in particular half-shell, opening of the cooling element from the plurality of, in particular half-shell, openings of the cooling element, whose diameter and/or shape have/has the best fit with a respective tool holder that is to be cooled. In particular, the rotational axis of the cooling element extends at least substantially centrally through the cooling element. In particular, a further rotational axis of the further cooling element extends at least substantially centrally through the further cooling element. In particular, the rotational axis of the cooling element and/or the further rotational axis of the further cooling element extend/extends at least substantially parallel to the axial direction of the shrink-clamping and/or unshrink-unclamping station and/or to a designated rotational axis of the tool holder that is to be cooled. "Substantially parallel" is here in particular to mean an orientation of a direction relative to a reference direction, in particular in a plane, the direction having a deviation from the reference direction that is in particular smaller than 8°, advantageously smaller than 5° and especially advantageously smaller than 2°.

In addition it is proposed that, by way of the rotational movement of the cooling element around the rotational axis and/or by way of the rotational movement of the further cooling element around the further rotational axis, it is possible to select a contact region of the cooling element, in particular a contact region of the cooling element that is suitable by its diameter, which is configured for a heat-conductive contact of the cooling element with a tool holder. This allows achieving advantageous cooling characteristics. In particular, it is thus possible to establish a particularly efficient heat-conductive contact between the cooling unit and the tool holder. An automated adaption of a contact surface of the cooling element, which is configured to contact the tool holder for a heat carry-off, is advantageously achievable. It is in particular possible to control the rotational movement of the cooling element around the rotational axis. In particular, for a selection of the suitable contact regions on the basis of data of the tool holder that is to be cooled, the control and/or regulation unit is configured to automatedly rotate the cooling element and/or the further cooling element until the suitable contact region is oriented toward the tool holder. In particular, the shrink-clamping and/or unshrink-unclamping station comprises an input unit that is configured to capture the data of the tool holder that is to be cooled and/or to transmit the data of the tool holder that is to be cooled to the control and/or regulation unit. The input unit in particular comprises an interface for a manual entry of the data of the tool holder that is to be cooled and/or an interface for an automated entry and/or capture of the data of the tool holder that is to be cooled, for example a QR-code reader appliance, a barcode reader appliance, an RFID reader appliance and/or an automatic camera recognition for tool holders.

It is moreover proposed that the cooling element and/or the further cooling element comprise/comprises at least one nozzle, which is configured to discharge cooling air towards a tool holder that is to be cooled. This allows achieving advantageous cooling characteristics. It is in particular advantageously possible to further improve a cooling function. In particular, in this way a cooling effect is achievable already prior to and/or after an establishment of a direct heat-conductive contact by means of the cooling elements, for example during a movement of the cooling unit and/or of the cooling elements and/or during an adjustment of the suitable, in particular, half-shell, opening of the cooling elements. The nozzle is in particular arranged within the, in particular half-shell, opening of the cooling element and/or of the further cooling element. It is conceivable for the cooling element and/or the further cooling element to comprise more than one nozzle.

Furthermore a method is proposed with a shrink-clamping and/or unshrink-unclamping station for tools for an at least largely automated shrink-clamping and/or unshrink-unclamping of tools into and/or from tool holders. This allows achieving advantageous cooling characteristics in a cooling of shrink-clamp tool chucks.

It is also proposed that in the method with a shrink-clamping and/or unshrink-unclamping station for tools, for a positioning of the cooling unit, in particular for an adjustment of a position of the cooling unit that is intended for the cooling operation state, relative to a tool holder that is previously heated by the induction heating unit and/or relative to the holding device of the shrink-clamping and/or unshrink-unclamping station, a linear guidance and/or a drive shaft are/is used which are/is identical to a linear guidance and/or a drive shaft for a positioning of the induction heating unit relative to the tool holder, in particular for an adjustment of a position of the induction heating unit that is intended for the induction heating operation state. As a result, advantageous cooling characteristics are achievable. In particular, it is advantageously possible to optimize a cooling process of the shrink-clamping process and/or of the unshrink-unclamping process of tools taking place directly after a heating of the tool holder. It is in particular possible to accelerate the shrink-clamping process and/or the unshrink-unclamping process, in particular as a time period between heating and cooling can be kept particularly short. Moreover, a high degree of automatization is advantageously achievable. Advantageously a high level of work-safety is achievable, in particular by an automated handling of hot tool holders. Beyond this advantageously a particularly simple construction of the shrink-clamping and/or unshrink-unclamping station may be enabled, resulting in an advantageous cost reduction. In particular during the entire shrink-clamping process, during the entire unshrink-unclamping process and/or during the entire cooling process, the cooling unit, in particular a center of gravity of the cooling unit, is in particular moved in the shrink-clamping and/or unshrink-unclamping station, relative to the tool holder that is to be cooled and/or to the holding device, exclusively along the axial direction of the cooling unit, in particular along the vertical axis of the shrink-clamping and/or unshrink-unclamping station.

It is further proposed that in the method with a shrink-clamping and/or unshrink-unclamping station for tools, for an optimization of the heat-conductive contact of the cooling unit with a tool holder that has previously been heated by the induction heating unit, a selection is made, in particular by the control and/or regulation unit, by means of a rotation of the cooling element, in particular around the rotational axis of the cooling element, of a best possible suitable contact surface of at least one cooling element of the cooling unit from a plurality of differently shaped contact surfaces of the cooling element. In this way advantageous cooling characteristics are achievable. In particular, this allows establishing an especially effective heat-conductive contact between the cooling unit and the tool holder, in particular as it is possible to select a suitable contact surface for each tool holder that is to be cooled. Advantageously an automated adaption of a contact surface of the cooling element, which is configured to contact the tool holder for a heat carry-off, is achievable. By a "best possible suitable contact surface" is in particular the contact surface from a plurality of available contact surfaces to be understood which has the greatest correlation with an outer shape of the tool holder that is to be cooled, in particular of the clamping region of the tool holder that is to be cooled, and/or whose respective, in particular half-shell, opening has a diameter that is greater than the diameter of the tool holder that is to be cooled, in particular of the clamping region of the tool holder that is to be cooled, and which at the same time shows a smallest difference from the diameter of the tool holder, in particular of the clamping region of the tool holder that is to be cooled. In particular, the differently shaped contact surfaces are implemented as openings, in particular half-shell openings, with different diameters.

The shrink-clamping and/or unshrink-unclamping station according to the invention and the method according to the invention are herein not to be restricted to the application, implementation and/or method sequence described here. In particular, to fulfill a functionality that is described here, the shrink-clamping and/or unshrink-unclamping station according to the invention and the method according to the invention may comprise a number of individual elements, structural components, method steps and units that differs from a number that is mentioned here. In particular, there may be variations of a described sequence of method steps.

DRAWINGS

Further advantages will become apparent from the following description of the drawings. The drawings show two exemplary embodiments of the invention. The drawings, the description and the claims contain a plurality of features in combination. Someone skilled in the art will purposefully also consider the features individually and will find further expedient combinations.

It is shown in.

DESCRIPTION OF THE EXEMPLARY EMBODIMENTS

Figure 1:
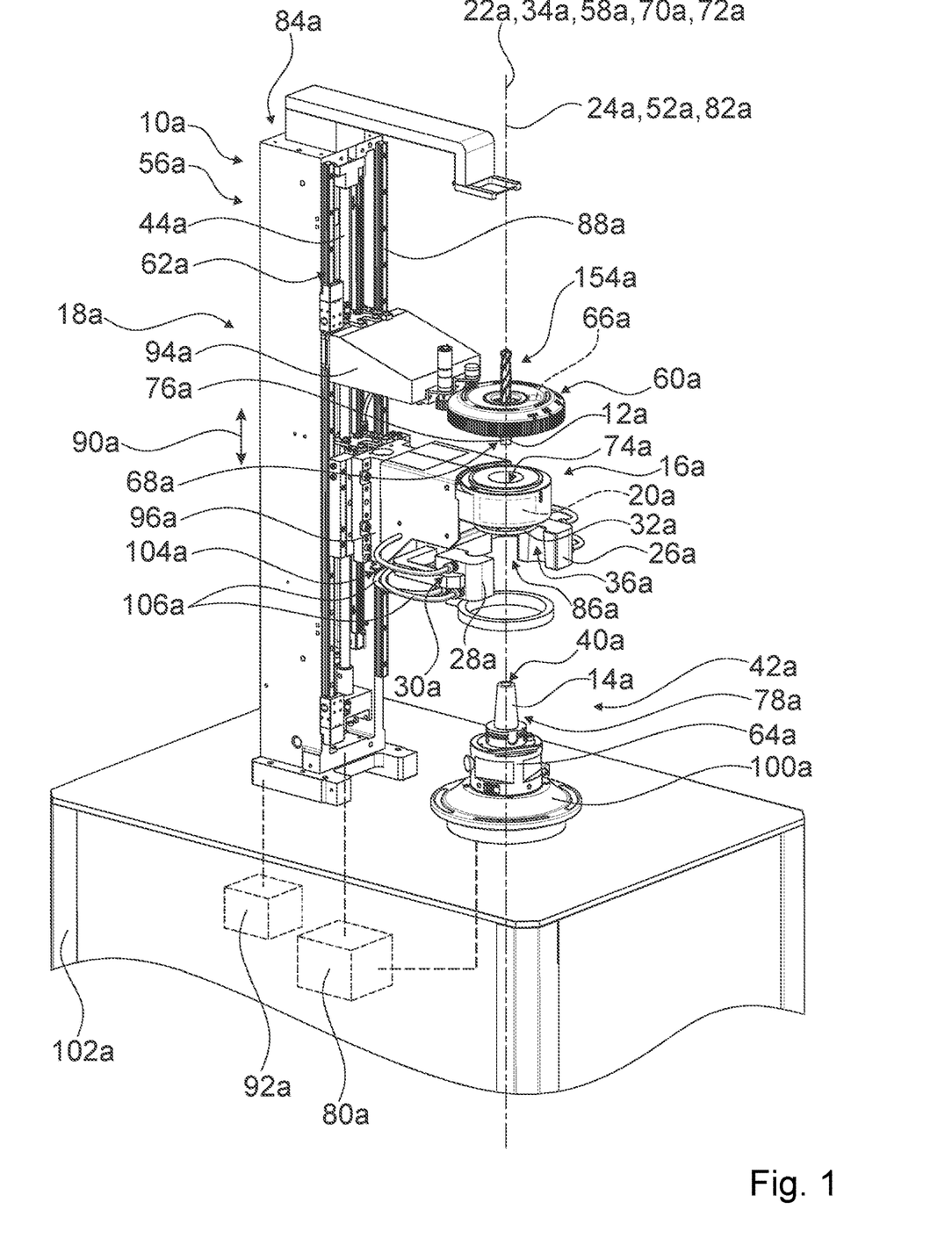
FIG. 1 a schematic perspective view of a shrink-clamping and/or unshrink-unclamping station with a cooling unit, FIG. 2 a schematic top view of the cooling unit in a cooling operation state, FIG. 3 a schematic top view of the cooling unit in an operation state that differs from the cooling operation state, FIG. 4 a flow chart of a method with the shrink-clamping and/or unshrink-unclamping station comprising the cooling unit, FIG. 5 a schematic top view of an alternative cooling unit in a cooling operation state, FIG. 6 a schematic top view of the alternative cooling unit in an operation state that differs from the cooling operation state, and FIG. 7 a flow chart of a method with an alternative shrink-clamping and/or unshrink-unclamping station comprising the alternative cooling unit.

FIG. 1 shows a shrink-clamping and/or unshrink-unclamping station 18a. The shrink-clamping and/or unshrink-unclamping station 18a is configured for an automated shrink-clamping and/or unshrink-unclamping of tools 12a into and/or from tool holders 14a. The shrink-clamping and/or unshrink-unclamping station 18a is configured to carry out a shrink-clamping process on tools 12a for a fixation of the tools 12a in tool holders 14a and/or to carry out an unshrink-unclamping process on tools 12a for a removal of the tools 12a from tool holders 14a. The tool holders 14a are embodied as shrink-clamp chucks. The tool holders 14a comprise tool receiving openings 40a. The tools 12a are implemented as shaft tools. The tools 12a comprise a tool shaft 76a. The tools 12a comprise a work region 154a. The tool receiving openings 40a of the tool holders 14a are configured to receive the tool shaft 76a of a tool 12a. Preferentially, in a state when clamped in the tool holder 14a, the tool shaft 76a is inserted in the tool receiving opening 40a of the tool holder 14a almost completely, in particular except for a region of maximally 5 mm, preferably maximally 3 mm, preferentially no more than 2 mm.

The shrink-clamping and/or unshrink-unclamping station 18a comprises an induction heating unit 16a, which may be referred to herein as an induction heater. The induction heating unit 16a is configured for heating the tool holders 14a. In the shrink-clamping process and/or in the unshrink-unclamping process the induction heating unit 16a is configured to expand the tool receiving opening 40a of the tool holder 14a by heating. The induction heating unit 16a comprises an induction coil 20a. The induction heating unit 16a is configured to generate an induction-magnetic field. The induction magnetic field is configured to interact with the material of the tool holder 14a for a heating and thus for an expansion of the tool holder 14a. The induction coil 20a has an opening 74a. The opening 74a of the induction coil 20a is oriented parallel to an axial direction 58a of the shrink-clamping and/or unshrink-unclamping station 18a. The induction coil 20a comprises coil windings, which are wound around the opening 74a of the induction coil 20a. The shrink-clamping and/or unshrink-unclamping station 18a comprises a control and/or regulation unit 80a. The control and/or regulation unit 80a is at least configured to apply an alternating current to the induction coil 20a for the purpose of a generation of an induction magnetic field.

The shrink-clamping and/or unshrink-unclamping station 18a comprises a screening unit 60a. The screening unit 60a is configured for screening the induction magnetic field generated by the induction heating unit 16a at least in an axial direction 24a of the induction coil 20a. The axial direction 24a of the induction coil 20a extends along a center of the opening 74a of the induction coil 20a. The axial direction 24a of the induction coil 20a corresponds to an axial direction 70a of the screening unit 60a. The axial direction 24a of the induction coil 20a corresponds to an axial direction 34a of a tool holder 14a positioned in the shrink-clamping and/or unshrink-unclamping station 18a. The axial direction 24a of the induction coil 20a corresponds to an axial direction 72a of a tool 12a that is fixated in a tool holder 14a positioned in the shrink-clamping and/or unshrink-unclamping station 18a. The screening unit 60a is arranged, along a vertical axis 82a of the shrink-clamping and/or unshrink-unclamping station 18a, above the induction heating unit 16a. The screening unit 60a is configured to provide an upper screening of the induction magnetic field of the induction heating unit 16a in the direction of the vertical axis 82a.

The screening unit 60a comprises an arrangement of movably supported screening elements 66a. The movably supported screening elements 66a are movable towards one another in such a way that they are capable of engaging around the tool shaft 76a of a tool 12a as completely as possible, thus creating a degree of screening that is as high as possible. The movably supported screening elements 66a are displaceable towards one another in such a way that they form an at least substantially closed screening plane with a variable opening for receiving tools 12a having different diameters. The screening elements 66a are implemented of a soft-magnetic material. The screening elements 66a are implemented of an electrically non-conductive material. The screening elements 66a are implemented of a soft-magnetic ferrite material.

The screening unit 60a also forms a tool gripper unit 68a. The screening unit 60a and the tool gripper unit 68a are implemented integrally with one another. For a realization of a shrink-clamping process, the tool gripper unit 68a is configured to insert a tool 12a into a tool holder 14a. For a realization of an unshrink-unclamping process, the tool gripper unit 68a is configured to remove a tool 12a from the tool holder 14a.

The shrink-clamping and/or unshrink-unclamping station 18a comprises a tower unit 84a. The tower unit 84a, in particular a main extension direction 90a of the tower unit 84a, extends parallel to the vertical axis 82a of the shrink-clamping and/or unshrink-unclamping station 18a. The screening unit 60a is movably supported on the tower unit 84a. The screening unit 60a comprises a carriage 94a. The carriage 94a of the screening unit 60a is configured for the movable support of the screening unit 60a on the tower unit 84a. Preferentially the screening unit 60a comprises at least two carriages 94a, as a result of which a particularly high precision of the movement of the screening unit 60a is advantageously achievable. The screening unit 60a is movable up and down on the tower unit 84a along the main extension direction 90a of the tower unit 84a. The screening unit 60a is movable up and down on the tower unit 84a in a CNC-controlled manner. The control and/or regulation unit 80a is configured to control the movement of the screening unit 60a along the tower unit 84a. The induction heating unit 16a is movably supported on the tower unit 84a. The induction heating unit 16a comprises a carriage 96a. The carriage 96a of the induction heating unit 16a is configured for the movable support of the induction heating unit 16a on the tower unit 84a. Preferably the induction heating unit 16a comprises at least two carriages 96a, as a result of which a particularly high precision of the movement of the induction heating unit 16a is advantageously achievable. The induction heating unit 16a is movable up and down on the tower unit 84a along the main extension direction 90a of the tower unit 84a. The induction heating unit 16a is movable up and down on the tower unit 84a in a CNC-controlled manner. The control and/or regulation unit 80a is configured to control the movement of the induction heating unit 16a along the tower unit 84a. The tower unit 84a comprises at least one guiding unit 62a with at least one guide rail 88a for guiding a movement of the induction heating unit 16a and/or of the screening unit 60a. Preferentially the guiding unit 62a comprises two guide rails 88a extending in parallel along the main extension direction 90a of the tower unit 84a. This advantageously allows achieving a particularly linear movement guidance. The induction heating unit 16a and the screening unit 60a form structural units which are movable relative to one another along the axial direction 24a.

The shrink-clamping and/or unshrink-unclamping station 18a comprises a drive shaft 44a. The drive shaft 44a is arranged at least largely in the tower unit 84a. The drive shaft 44a is configured to couple with the tool gripper unit 68a, in particular the screening unit 60a. The drive shaft 44a is configured to couple with the induction heating unit 16a. In a state when coupled with the drive shaft 44a, during a rotation of the drive shaft 44a, the tool gripper unit 68a and/or the induction heating unit 16a are moved along the axial direction 24a upwards or downwards depending on a rotation direction of the drive shaft 44a. The induction heating unit 16a is couplable with the drive shaft 44a via a rolling ring drive. The tool gripper unit 68a is couplable with the drive shaft 44a via a further rolling ring drive. Each of the rolling ring drives forms an Uhing drive together with the drive shaft 44a. For a coupling with the drive shaft 44a an Uhing nut, allocated to the respective rolling ring drive, is clamped onto the drive shaft 44a, for example mechanically, pneumatically or hydraulically.

The shrink-clamping and/or unshrink-unclamping station 18a comprises a holding device 42a. The holding device 42a is configured for a holding of a tool holder 14a in the shrink-clamping and/or unshrink-unclamping station 18a. The holding device 42a comprises a spindle unit 100a. The spindle unit 100a is rotatable. The spindle unit 100a is fixedly connected with a base unit 102a of the shrink-clamping and/or unshrink-unclamping station 18a. The holding device 42a comprises an attachment holder 64a. The attachment holder 64a is interchangeably insertable in the spindle unit 100a. The attachment holder 64a is configured to provide a suitable receiving region for a respective defined tool holder type.

The shrink-clamping and/or unshrink-unclamping station 18a comprises a cooling unit 86a, which may be referred to herein as a cooler. Viewed along the vertical axis 82a, the cooling unit 86a is arranged beneath the induction coil 20a. The cooling unit 86a is arranged, in the axial direction 24a, directly beneath the induction heating unit 16a. The cooling unit 86a is configured for a cooling of the tool holder 14a directly after insertion of a tool 12a in the tool holder 14a and/or directly after a removal of a tool 12a from the tool holder 14a. The cooling unit 86a is configured for a cooling of a clamping region 78a of the tool holder 14a directly following an insertion of a tool 12a into the tool holder 14a and/or directly following a removal of a tool 12a from the tool holder 14a. The cooling unit 86a is configured for cooling the tool holder 14a, in particular the clamping region 78a of the tool holder 14a, to a lukewarm temperature. Lukewarm temperatures are temperatures below 50° C., preferably below 40° C. and preferentially below 30° C. The cooling unit 86a can be automatically brought into a heat-conductive contact with a tool holder 14a previously heated by the induction heating unit 16a.

The shrink-clamping and/or unshrink-unclamping station 18a comprises a linear guidance 10a. The cooling unit 86a is automatedly traversable along the linear guidance 10a. The cooling unit 86a is automatedly traversable in the axial direction 22a of the cooling unit 86a by the linear guidance 10a. The induction heating unit 16a is automatedly traversable along the linear guidance 10a. The induction heating unit 16a is automatedly traversable in the axial direction 24a of the induction heating unit 16a by the linear guidance 10a. The linear guidance 10a comprises the guiding unit 62a. The linear guidance 10a comprises the drive shaft 44a. The linear guidance 10a comprises a drive unit (not shown) that drives the drive shaft 44a. The linear guidance 10a permits exclusively a one-dimensional translational traversing of the induction heating unit 16a and/or of the cooling unit 86a. In a mounted state of the shrink-clamping and/or unshrink-unclamping station 18a, the cooling unit 86a and the induction heating unit 16a are fixedly coupled with one another. The cooling unit 86a and the induction heating unit 16a are implemented integrally with one another. The cooling unit 86a and the induction heating unit 16a are coupled with the tower unit 84a and/or supported on the tower unit 84a via the same carriage 96a. The cooling unit 86a is capable of being automatedly put onto the tool holder 14a held in the holding device 42a. The linear guidance 10a is configured for putting the cooling unit 86a onto the tool holder 14a held in the holding device 42a by a movement along the vertical axis 82a and/or for removing the cooling unit 86a from the tool holder 14a held in the holding device 42a by a movement along the vertical axis 82a.

The cooling unit 86a comprises an air cooler. The air cooler is in particular embodied as a pressurized-air cooler. The cooling unit 86a comprises a nozzle 38a. The nozzle 38a is configured to blow cooling air, in particular pressurized air, in a direction that is perpendicular to the axial direction 24a of the induction coil 20a. The nozzle 38a is configured to blow cooling air towards a tool holder 14a. The nozzle 38a is configured to blow cooling air onto a tool holder 14a previously heated by the induction unit 16a: The cooling unit 86a comprises a cool ring 32a. The air cooler comprises the cool ring 32a. The cool ring 32a is configured to be put over a previously heated tool holder 14a during a cooling operation, in particular in a cooling operation state. The cool ring 32a comprises a plurality of nozzles 38a, which are arranged toward an interior of the cool ring 32a. The induction coil 20a and the cool ring 32a are centered around a shared axis extending along a center of the opening 74a of the induction coil 20a. The shrink-clamping and/or unshrink-unclamping station 18a comprises a pressurized-air generating unit 92a. The pressurized-air generating unit 92a is configured to provide cooling air for the air cooler. The cooling unit 86a comprises a first air-feed duct 98a. The first air-feed duct 98a forms a pressurized-air conducting connection between the nozzle 38a, in particular the cool ring 32a, and the pressurized-air generating unit 92a. The control and/or regulation unit 80a is configured to control, in particular to activate and/or deactivate, the pressurized-air generating unit 92a.

The linear guidance 10a is configured to generate an oscillating movement of the carriage 96a. The linear guidance 10a is configured to generate an oscillating movement of the cooling unit 86a. The linear guidance 10a is configured to move the cooling unit 86a, in particular the cool ring 32a, during the cooling operation, in particular in the cooling operation state. The linear guidance 10a is configured to oscillatingly move the cooling unit 86a, in particular the cool ring 32a, during the cooling operation, in particular in the cooling operation state. The drive unit of the linear guidance 10a is configured to generate the oscillating movement of the cooling unit 86a, in particular the cool ring 32a, relative to the tower unit 84a. This advantageously allows achieving a particularly effective cooling and/or an even distribution of a cooling performance of the cooling unit 86a, in particular of the cool ring 32a.

The cooling unit 86a comprises a cooling element 26a. The cooling unit 86a comprises a further cooling element 28a. The further cooling element 28a is embodied separately from the cooling element 26a. The cooling elements 26a, 28a are configured, in the cooling operation state, to be in a heat-conductive contact with a tool holder 14a that is to be cooled (cf. FIG. 2). The cooling elements 26a, 28a are configured, in the cooling operation state, to engage around the tool holder 14a to a large extent. In the cooling operation state the cooling elements 26a, 28a engage around the tool holder 14a that is to be cooled in a circumferential direction. In the cooling operation state the cooling elements 26a, 28a engage around the tool holder 14a that is to be cooled at least in the clamping region 78a of the tool holder 14a. The cooling elements 26a, 28a mutually touch each other in the cooling operation state, in which the cooling elements 26a, 28a are in a heat-conductive contact with a tool holder 14a. The cooling element 26a comprises an opening 36a. The opening 36a is embodied as an, in particular semispherical, recess that is located sidewise on the cooling element 26a. The opening 36a of the cooling element 26a is embodied as a half-shell opening 36a. The further cooling element 28a comprises an opening 36a. The opening 36a is embodied as an, in particular semispherical, recess that is located sidewise on the further cooling element 28a. The opening 36a of the further cooling element 28a is embodied as a half-shell opening 36a. The half-shell openings 36a are each configured to engage around approximately half a circumference of a tool holder 14a. The openings 36a of the cooling elements 26a, 28a each have a surface 54a. The surfaces 54a of the openings 36a are implemented of a flexible tissue. The flexible tissue is embodied as a metal tissue, in particular as a copper or aluminum tissue. In the cooling operation state the flexible tissue allows the surface 54a of an opening 36a adapting to an outer shape of a tool holder 14a that is to be cooled.

Figure 2:
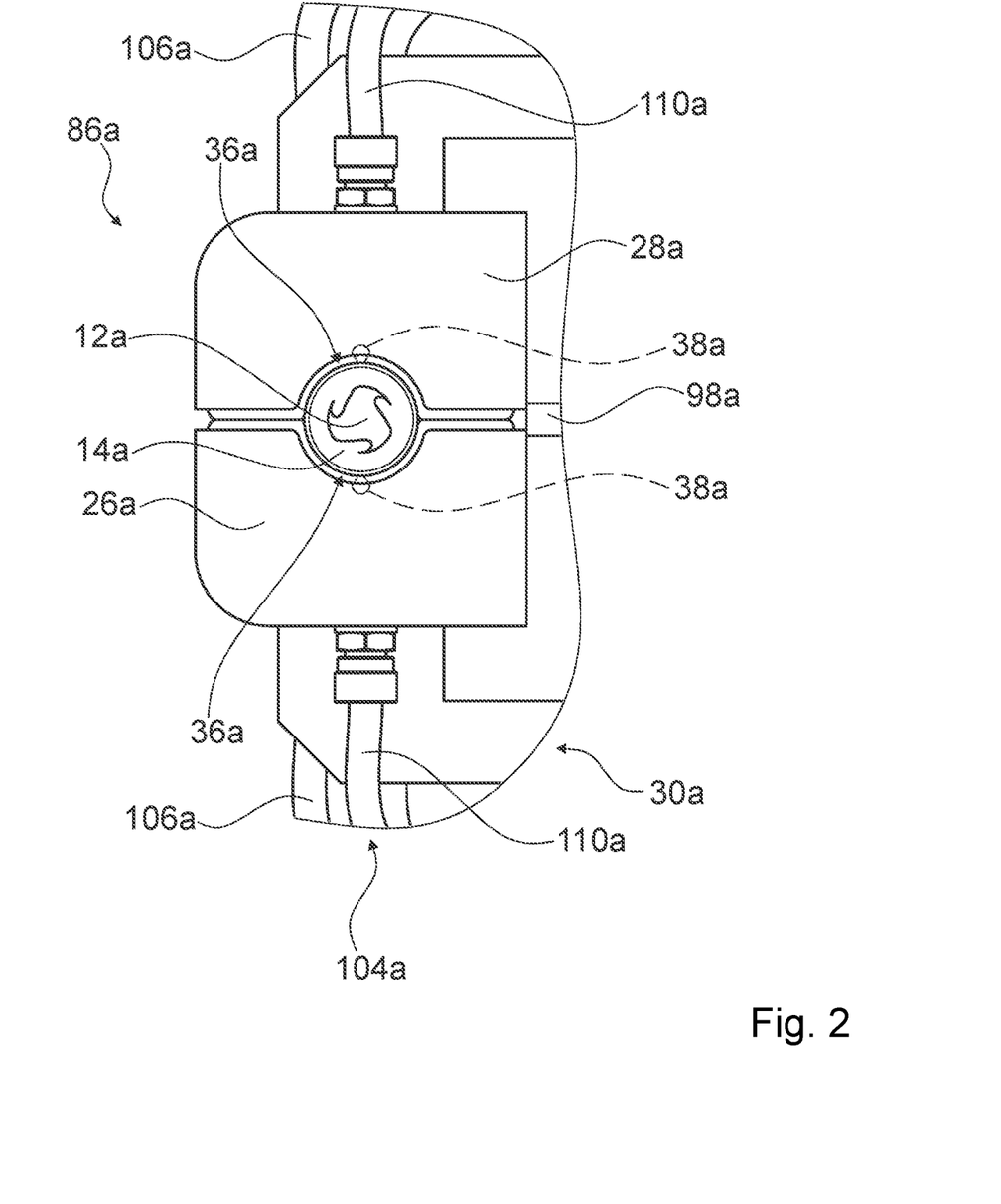

The cooling element 26a is implemented such that it is capable of being flowed through by a cooling liquid. The further cooling element 28a is implemented such that it is capable of being flowed through by a cooling liquid. The shrink-clamping and/or unshrink-unclamping station 18a comprises a cooling-agent guidance 104a. The cooling-agent guidance 104a is embodied as a cooling cycle. Alternatively the cooling-agent guidance 104a may be not implemented as a cycle, which means that, for example, it may be connected to an external water supply. The cooling-agent guidance 104a comprises at least one revolution appliance (not shown), for example a pump, which is configured to generate a flow movement of the cooling liquid. The cooling-agent guidance 104a comprises cooling-agent ducts 106a. The cooling-agent ducts 106a are configured for a feeding of cooling liquid to the cooling elements 26a, 28a and/or for conveying used cooling liquid away from the cooling elements 26a, 28a. If the cooling-agent guidance 104a is embodied as a cooling cycle, the cooling-agent guidance 104a comprises at least one regeneration unit (not shown), for example a heat exchanger, which is configured to extract heat absorbed by the cooling liquid from the cooling liquid and/or to feed regenerated, respectively cooled, cooling liquid back into the cooling cycle.

The cooling element 26a comprises the nozzle 38a. The further cooling element 28a comprises the nozzle 38a. The nozzles 38a of the cooling elements 26a, 28a are configured to discharge cooling air towards a tool holder 14a that is to be cooled. The nozzles 38a of the cooling elements 26a, 28a are configured to discharge pressurized air towards a tool holder 14a that is to be cooled. The nozzles 38a of the cooling elements 26a, 28a are each arranged within an opening 36a of the respective cooling element 26a, 28a. The cooling elements 26a, 28a each comprise an air-feed duct 110a. The air-feed duct 110a of the cooling elements 26a, 28a is configured to convey cooling air from the pressure-generating unit 92a to the nozzles 38a of the cooling elements 26a, 28a. The air-feed duct 110a of the cooling elements 26a, 28a connects the pressure-generating unit 92a to the nozzles 38a of the cooling elements 26a, 28a.

Figure 3:
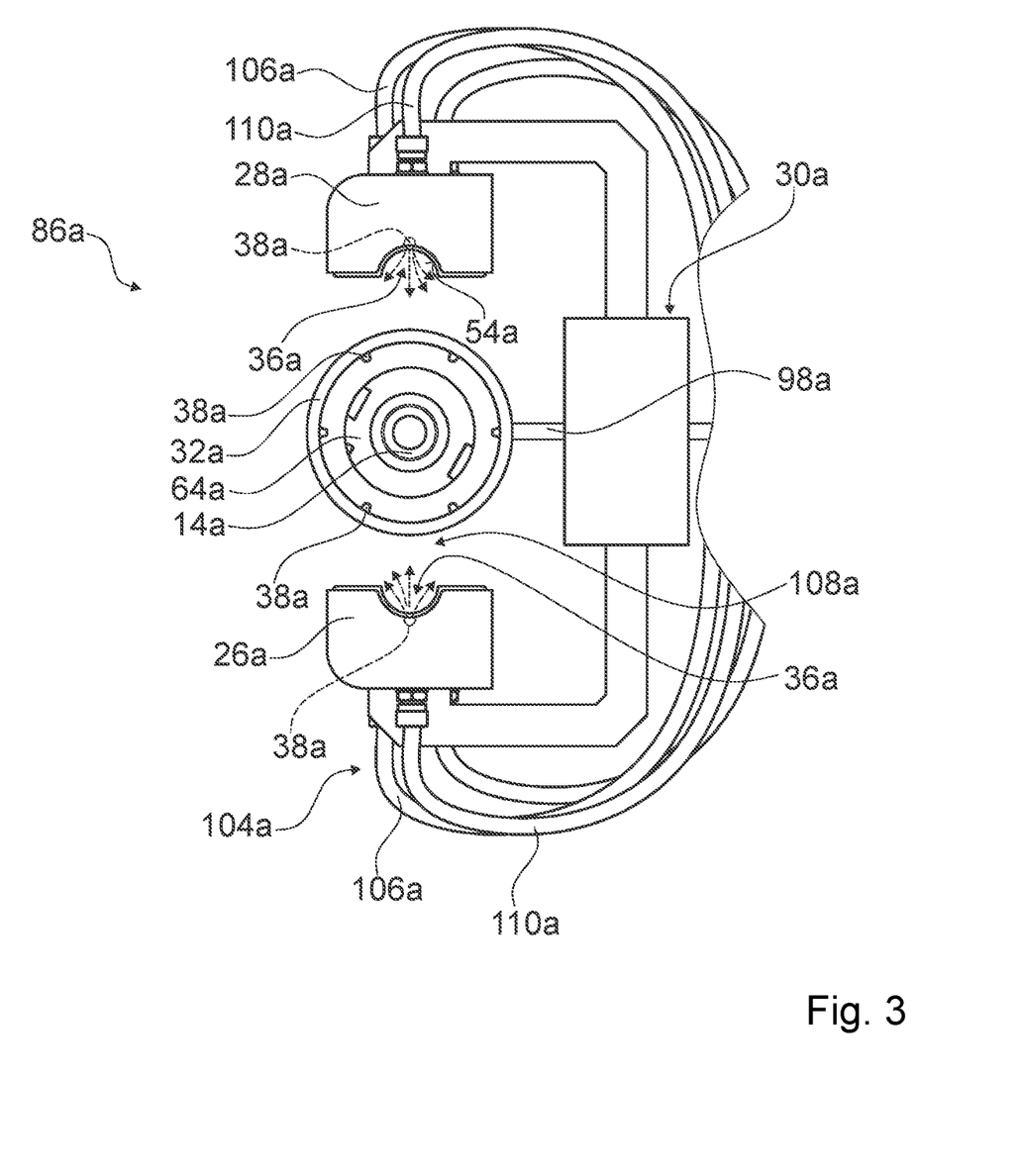

The cooling element 26a and the further cooling element 28a are supported in such a way that they are movable relative to one another. The cooling element 26a and the further cooling element 28a are translationally movable relative to one another. The shrink-clamping and/or unshrink-unclamping station 18a comprises a support unit 30a. The support unit 30a is configured to support the cooling element 26a and the further cooling element 28a in such a way that they are movable relative to one another. The cooling element 26a and the further cooling element 28a are movable by the support unit 30a at least in a plane that is perpendicular to the axial direction 34a of a tool holder 14a positioned in the shrink-clamping and/or unshrink-unclamping station 18a. The cooling elements 26a, 28a are movable towards each other and/or away from each other by means of the support unit 30a. The support unit 30a is configured, outside the cooling operation state, to bring the cooling elements 26a, 28a into positions permitting an obstruction-free putting-on of the induction heating unit 16a onto the tool holder 14a by a movement of the induction heating unit 16a along the vertical axis 82a (cf. FIG. 3). In the position permitting the obstruction-free putting-on of the induction heating unit 16a onto the tool holder 14a, the cooling elements 26a, 28a are spaced apart from one another, in particular in such a way that the entire tool holder 14a along the axial direction 34a of the tool holder 14a and/or at least an upper portion of the holding device 42a oriented along the vertical axis 82a fit/fits into an interstice 108a created between the cooling elements 26a, 28a. In the cooling operation state the cooling elements 26a, 28a are pushed towards one another as far as possible by the support unit 30a. In the cooling operation state the cooling elements 26a, 28a are pushed towards each other by the support unit 30a such that they touch each other. The support unit 30a comprises a drive unit (not shown), which is configured to generate the movement of the cooling elements 26a, 28a towards each other hydraulically, pneumatically and/or electro-motorically. The control and/or regulation unit 80a is configured to control and/or to regulate the movement of the cooling elements 26a, 28a relative to one another.

Figure 4:
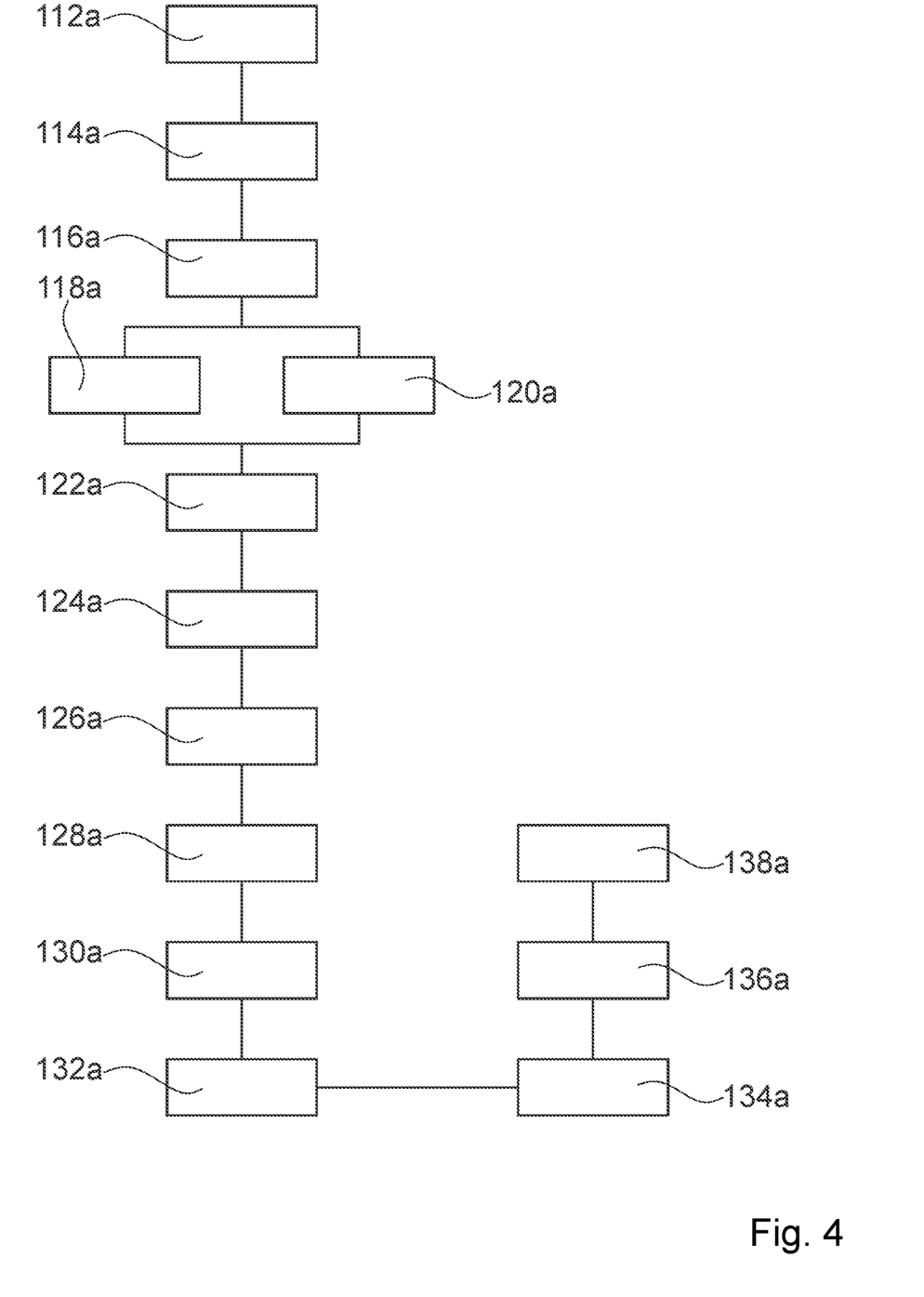

FIG. 4 shows a flow chart of a method with the shrink-clamping and/or unshrink-unclamping station 18a comprising the cooling unit 86a. In at least one method step 112a the cooling elements 26a, 28a are moved in directions that are perpendicular to the vertical axis 82a of the shrink-clamping and/or unshrink-unclamping station 18a in such a way that a distance between the cooling elements 26a, 28a is increased. In the method step 112a the cooling elements 26a, 28a are brought into positions permitting an obstruction-free putting on of the induction heating unit 16a onto a tool holder 14a. In the method step 112a the cooling unit 86a is not in the cooling operation state. In at least one further method step 114*a* the induction heating unit 16*a* is put onto the tool holder 14*a*. In the method step 114*a* the induction heating unit 16*a* is put onto the tool holder 14*a* by means of a downward movement along the vertical axis 82*a*. In the method step 114*a*, during the movement of the induction unit 16*a* the cooling elements 26*a*, 28*a* are moved in a collision-free manner sideways past the tool holder 14*a* and/or sideways past a, viewed along the vertical axis 82*a*, upper portion of the holding device 42*a*. In at least one further method step 116*a* at least the clamping region 78*a* of the tool holder 14*a* is heated by an induction-magnetic field of the put-on induction heating unit 16*a*. In the method step 116*a* the tool receiving opening 40*a* of the tool holder 14*a* is expanded in such a way that it is possible to insert a tool 12*a* into the tool receiving opening 40*a* or to remove a tool 12*a* out of the tool receiving opening 40*a*. In at least one further method step 118*a* a tool 12*a* is inserted into the expanded tool receiving opening 40*a* of the tool holder 14*a*. Alternatively in at least one further method step 120*a* a tool 12*a* is removed out of the expanded tool receiving opening 40*a* of the tool holder 14*a*.

In at least one further method step 122*a* the induction heating unit 16*a* is taken off the heated tool holder 14*a* by a traversing of the induction heating unit 16*a* along the vertical axis 82*a* upwards. During the traversing of the induction heating unit 16*a*, cooling air from the nozzles 38*a* of the cool ring 32*a* and/or of the cooling elements 26*a*, 28*a* is optionally applied to the tool holder 14*a*. In at least one further optional method step 124*a* the cooling unit 86*a* is moved up and down in an oscillating fashion, such that cooling air flowing out of the nozzles 38*a* of the cooling unit 86*a* reaches the entire heated region of the tool holder 14*a*, in particular the entire clamping region 78*a*. In at least one further method step 126*a* the induction heating unit 16*a*, and thus the cooling unit 86*a* that is coupled with the induction heating unit 16*a*, is traversed along the vertical axis 82*a* until the cooling elements 26*a*, 28*a* of the cooling unit 86*a* are situated on a level with the heated region of the tool holder 14*a*, in particular the clamping region 78*a*. In the method steps 122*a*, 124*a* and 126*a*, for the traversing, i.e. for the positioning of the cooling unit 86*a* relative to the tool holder 14*a* previously heated by the induction heating unit 16*a*, a linear guidance 56*a* and/or a drive shaft 44*a* are/is used which are/is identical to a linear guidance 56*a* and/or a drive shaft 44*a* used for a traversing, i.e. for a positioning of the induction heating unit 16*a* relative to the tool holder 14*a*. In at least one further method step 128*a* the cooling elements 26*a*, 28*a* are moved towards each other. In the method step 128*a* the heated region of the tool holder 14*a*, in particular the clamping region 78*a*, is encompassed by the cooling elements 26*a*, 28*a*. In the method step 128*a* a surface of the tool holder 14*a* is contacted by a surface 54*a* of an opening 36*a*, 46*a* of the cooling elements 26*a*, 28*a*. In at least one further method step 130*a* heat is discharged from the tool holder 14*a* to the cooling elements 26*a*, 28*a*. In the method step 130*a* the cooling elements 26*a*, 28*a* are flowed through by the cooling liquid. In the method step 130*a* the tool holder 14*a* is cooled actively. In at least one further method step 132*a* the heat taken in by the cooling elements 26*a*, 28*a* is carried off by the cooling liquid via the cooling-agent guidance 104*a*.

In at least one further method step 134*a* the cooling elements 26*a*, 28*a* are removed from the tool holder 14*a*. In the method step 134*a* the cooling elements 26*a*, 28*a* are brought into positions permitting an obstruction-free putting-on of the induction heating unit 16*a* onto the tool holder 14*a*. In at least one further method step 136*a* the induction heating unit 16*a* and the cooling unit 86*a* are traversed along the vertical axis 82*a* upwards, away from the cooled-down tool holder 14*a*. In at least one further method step 138*a* the cooled-down tool holder 14*a* is removed out of the holding device 42*a*. The removal of the tool holder 14*a* out of the holding device 42*a* may be realized mechanically by means of a handling robot (not shown) or manually by an operator. Because of the cooling of the tool holder 14*a*, there is advantageously no danger of injury, in particular no danger of burn, for the operator.

Figure 5:
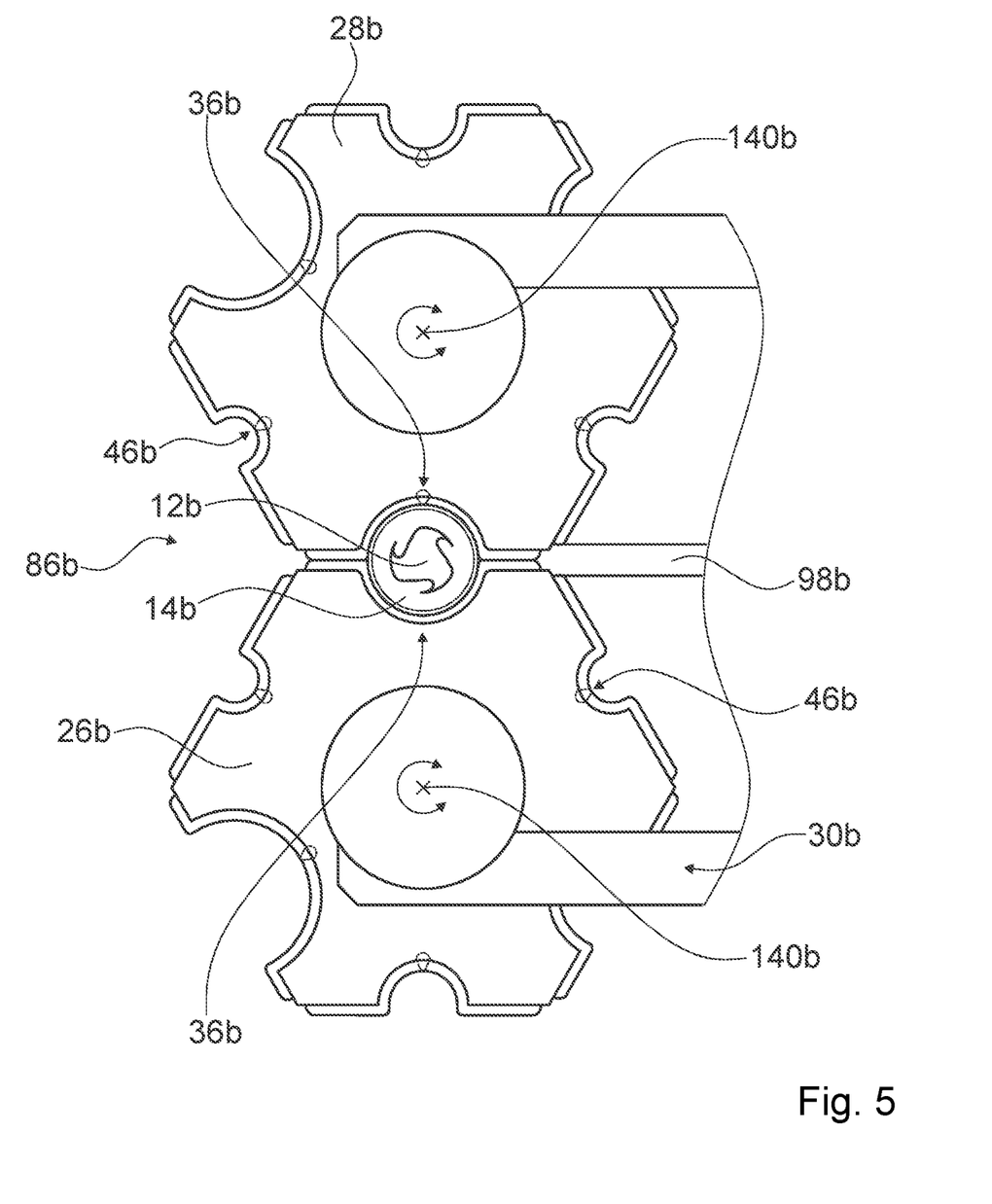
Figure 6:
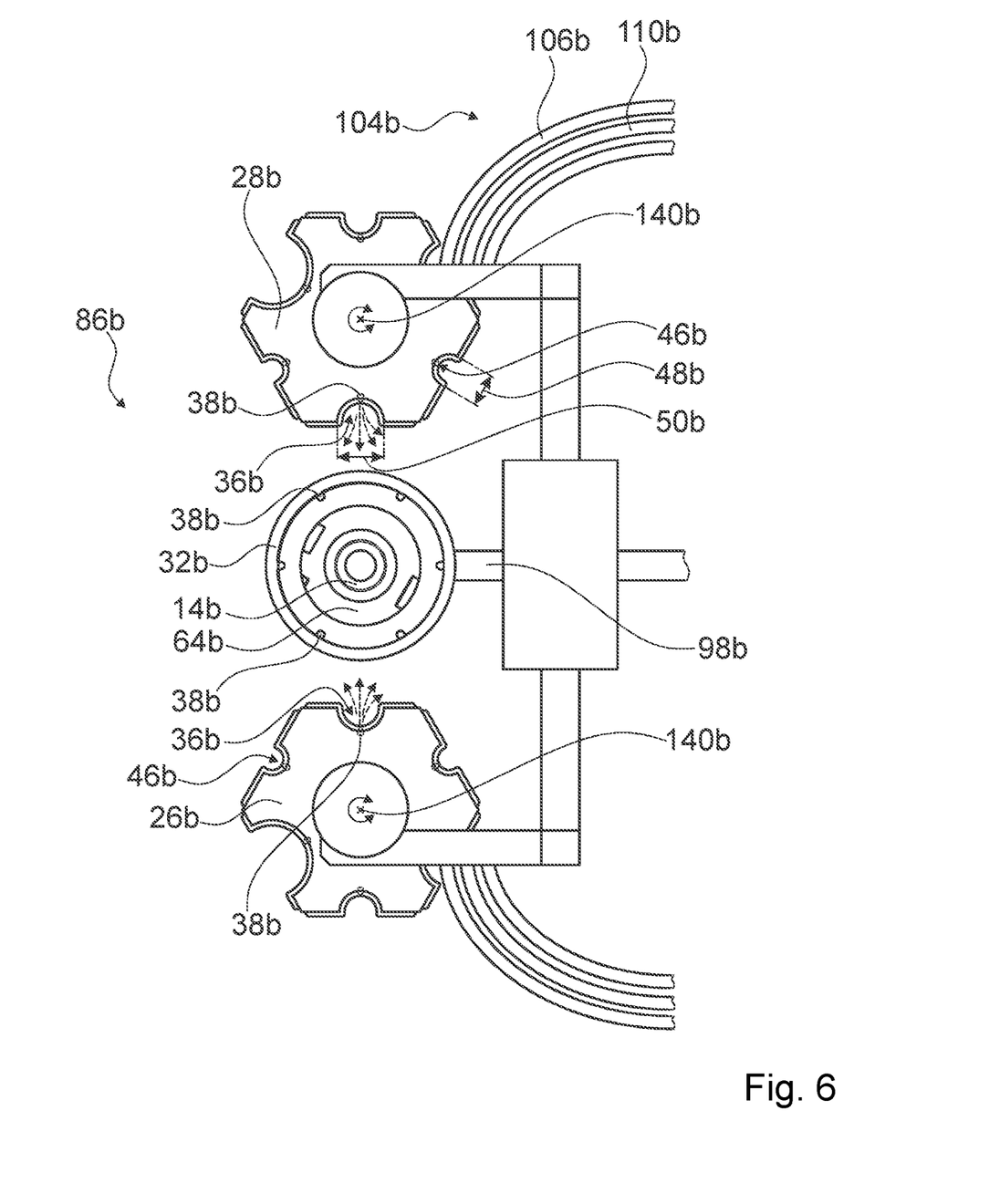
Figure 7:
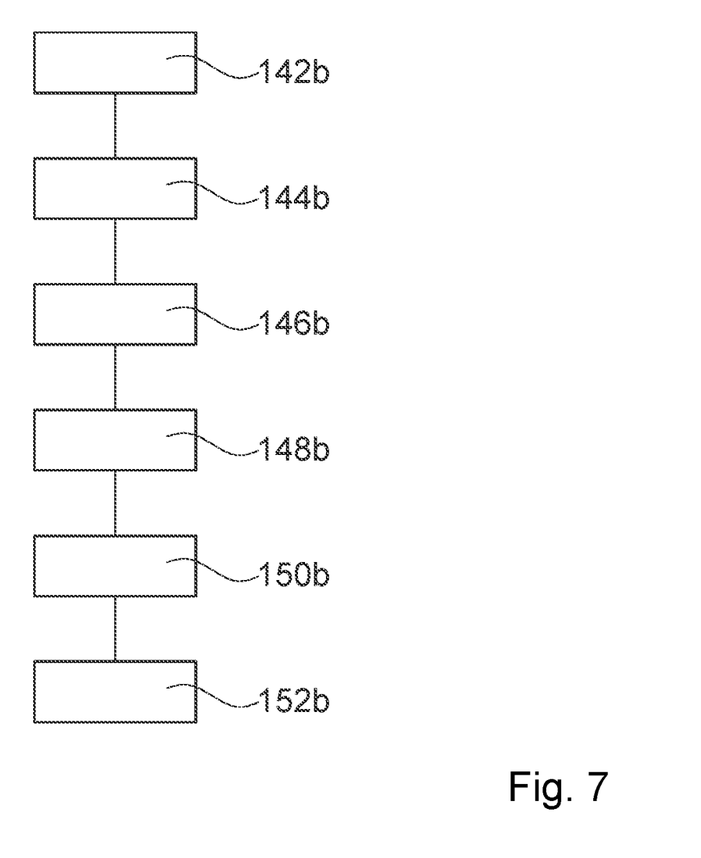

FIGS. 5, 6 and 7 show a further exemplary embodiment of the invention. The following description and the drawings are essentially limited to the differences between the exemplary embodiments wherein regarding identically denominated structural components, in particular structural components having the same reference numerals, the drawings and/or the description of the other exemplary embodiment of FIGS. 1 to 4 may principally be referred to. To distinguish between the exemplary embodiments, the letter a has been added to the reference numerals of the exemplary embodiment of FIGS. 1 to 4. In the exemplary embodiment of FIGS. 5, 6 and 7 the letter a has been substituted by the letter b.

FIGS. 5 and 6 show top views of an alternative cooling unit 86*b* of an alternative shrink-clamping and/or unshrink-unclamping station 18*b*. The cooling unit 86*b* comprises a cooling element 26*b*. The cooling unit 86*b* comprises a further cooling element 28*b*. In FIG. 5 the cooling elements 26*b*, 28*b* are in an arrangement assumed by the cooling elements 26*b*, 28*b* in a cooling operation state. In FIG. 6 the cooling elements 26*b*, 28*b* are in an arrangement assumed by the cooling elements 26*b*, 28*b* outside of the cooling operation state. The further cooling element 28*b* is embodied separately from the cooling element 26*b*. The cooling elements 26*b*, 28*b* each have a further half-shell opening 46*b*. The further opening 46*b* is respectively embodied as a further half-shell opening 46*b*. Like the opening 36*b*, the further opening 46*b* is also configured to engage around approximately half a circumference of a tool holder 14*b*. The opening 36*b* has a diameter 50*b*. The further opening 46*b* has a diameter 48*b*. The diameter 48*b* of the further opening 46*b* differs from the diameter 50*b* of the opening 36*b*. All in all, the cooling elements 26*b*, 28*b* shown in FIG. 5 each have six openings with differing diameters. The openings 36*b*, 46*b* of the cooling elements 26*b*, 28*b* are arranged around the cooling elements 26*b*, 28*b* in a circumferential direction. Each opening 36*b*, 46*b* comprises at least one nozzle 38*b* for discharging cooling air towards a tool holder 14*b*. The openings 36*b*, 46*b* form a plurality of differently shaped contact surfaces of the cooling element 26*b*, 28*b*.

The cooling element 26*b* is rotatable around a rotation axis 52*b*. The further cooling element 28*b* is rotatable around a rotation axis 140*b*. The rotation axis 52*b* of the cooling element 26*b* and the rotation axis 140*b* of the further cooling element 28*b* are aligned parallel to one another. The rotation axis 52*b* of the cooling element 26*b* and the rotation axis 140*b* of the further cooling element 28*b* extend parallel to a vertical axis 82*b* of the shrink-clamping and/or unshrink-unclamping station 18*b* and/or parallel to an axial direction 22*b* of the cooling unit 86*b*. The rotation axes 52*b*, 140*b* extend centrally through the cooling elements 26*b*, 28*b*. The rotation axes 52*b*, 140*b* approximately extend through the centers of gravity of the cooling elements 26*b*, 28*b*. By means of a rotational movement of the cooling elements 26*b*, 28*b* around the respective rotation axes 52*b*, 140*b*, a contact region of the cooling elements 26*b*, 28*b* is selectable that is suitable for a heat-conductive contact of the cooling elements 26b, 28b with a tool holder 14b that is to be cooled. For a selection of the suitable contact regions and/or for a selection of the suitable openings 36b, 46b, the cooling elements 26b, 28b are rotatable in a revolver-like fashion.

FIG. 7 shows a flow chart of a method with an alternative shrink-clamping and/or unshrink-unclamping station 18b comprising the alternative cooling unit 86b. In at least one method step 142b, spaced-apart cooling elements 26b, 28b are positioned along the vertical axis 82b on a level with a previously heated region of a tool holder 14b, in particular on a level with a clamping region 78b of the tool holder 14b. In at least one further method step 144b, adjustment of the rotational positions of the cooling elements 26b, 28b is carried out on the basis of data of the tool holder 14b defining a tool holder type. In the method step 144b the cooling elements 26b, 28b are rotated around their rotation axes 52b, 140b. For an optimization of the heat-conductive contact of the cooling unit 86b with a tool holder previously heated by an induction unit 16b, a selection of a best possible suitable contact surface of at least one cooling element 26b, 28b of the cooling unit 86b from a plurality of differently shaped contact surfaces of the cooling element 26b, 28b is made in the method step 144b by a rotation of the cooling element 26b, 28b. In at least one further method step 146b, cooling air is blown out of the nozzles 38b of the openings 36b, 46b, which have been selected by the rotation and which point towards the tool holder 14b that is to be cooled. In at least one further method step 148b, the cooling elements 26b, 28b are moved towards one another until the cooling elements 26b, 28b contact and/or engage around the tool holder 14a. In the method step 148b the cooling elements 26b, 28b are moved towards one another until the cooling elements 26b, 28b touch each other. In at least one further method step 150b, the cooling elements 26b, 28b are flowed through by a cooling liquid. In the method step 150b the tool holder 14b is cooled actively. In the method step 150b heat is transferred from the tool holder 14b to the cooling elements 26b, 28b. In at least one further method step 152b, the heat transferred to the cooling elements 26b, 28b is carried off via a cooling-agent guidance 104b.

The invention claimed is:

1. A shrink-clamping and unshrink-unclamping station for tools, for a shrink-clamping and unshrink-unclamping of tools into and from tool holders which is automated in that, except for an insertion of the tool or the tool holder in the shrink-clamping and unshrink-unclamping station and except for the removal of the tool or the tool holder from the shrink-clamping and unshrink-unclamping station, all work steps of the shrink-clamping and unshrink-unclamping station run independently from an operator, with an induction heater and with a cooler, wherein the cooler can in an automated manner be brought into a heat-conductive contact with a tool holder previously heated by the induction heater, and with a linear guidance, along which at least the cooler and the induction heater are automatedly traversable, wherein the cooler is arranged, in an axial direction of the induction heater, which extends along a center of an opening of the induction coil, directly beneath or directly above the induction heater, wherein the cooler comprises at least one cooling element that is capable of being flowed through by a cooling liquid, wherein the cooler comprises at least one further cooling element that is capable of being flowed through by a cooling liquid and is embodied separately from the cooling element, the shrink-clamping and unshrink-unclamping station comprising a support unit, which is configured to support the cooling element and the further cooling element such that the cooling element and the further cooling element are movable relative to one another and wherein in a cooling operation state, in which the cooling elements are in a heat-conductive contact with a tool holder, the cooling elements are configured to engage around the tool holder, at least to 80%.

2. The shrink-clamping and unshrink-unclamping station according to claim 1, wherein in a mounted state the cooler and the induction heater are fixedly coupled with each other.

3. The shrink-clamping and unshrink-unclamping station according to claim 1, wherein the cooler comprises at least an air cooler.

4. The shrink-clamping and unshrink-unclamping station according to claim 3, wherein the air cooler comprises a cool ring.

5. The shrink-clamping and unshrink-unclamping station according to claim 1, wherein the cooling element and the further cooling element are movable by means of the support unit at least in a plane that is perpendicular to a designated axial direction of a tool holder positioned in the shrink-clamping and unshrink-unclamping station.

6. The shrink-clamping and unshrink-unclamping station according to claim 1, wherein in a cooling operation state, in which the cooling elements are in a heat-conductive contact with a tool holder, the cooling elements touch one another.

7. The shrink-clamping and unshrink-unclamping station according to claim 1, wherein the support unit is configured, outside a cooling operation state, to bring the cooling elements in positions allowing an obstruction-free putting-on of the induction heater onto the tool holder.

8. The shrink-clamping and unshrink-unclamping station according to claim 1, wherein the cooling element comprises an opening, which is configured to engage around approximately half a circumference of a tool holder.

9. The shrink-clamping and unshrink-unclamping station according to claim 8, wherein at least a region of the opening that is configured to establish a heat-conductive contact is implemented by a flexible tissue.

10. The shrink-clamping and unshrink-unclamping station according to claim 8, wherein the cooling element comprises at least one further opening, which is likewise configured to engage around approximately half a circumference of a tool holder, a diameter of the further opening differing from a diameter of the opening.

11. The shrink-clamping and unshrink-unclamping station according to claim 1, wherein the cooling element is rotatable.

12. The shrink-clamping and unshrink-unclamping station according to claim 11, wherein by way of a rotational movement of the cooling element around a rotational axis, a selection of a suitable contact region of the cooling element, which is configured for a heat-conductive contact of the cooling element with a tool holder is made possible.

13. The shrink-clamping and unshrink-unclamping station according to claim 1, wherein the cooling element and the further cooling element comprise/comprises at least one nozzle, which is configured to discharge cooling air towards a tool holder that is to be cooled.

14. A method with a shrink-clamping and unshrink-unclamping station for tools according to claim 1, which is intended for an at least largely automated shrink-clamping and unshrink-unclamping of tools into and from tool holders, wherein for an optimization of the heat-conductive contact of the cooler with a tool holder previously heated by the induction heater, a selection is made, by means of a rotation of the cooling element, of a contact surface of at least one cooling element of the cooler from a plurality of differently shaped contact surfaces of the cooling element.

15. The method according to claim 14, wherein the linear guidance is used for positioning the cooler relative to a tool holder previously heated by the induction heater and for positioning the induction heater relative to the tool holder.

* * * * *